UNITED STATES PATENT OFFICE.

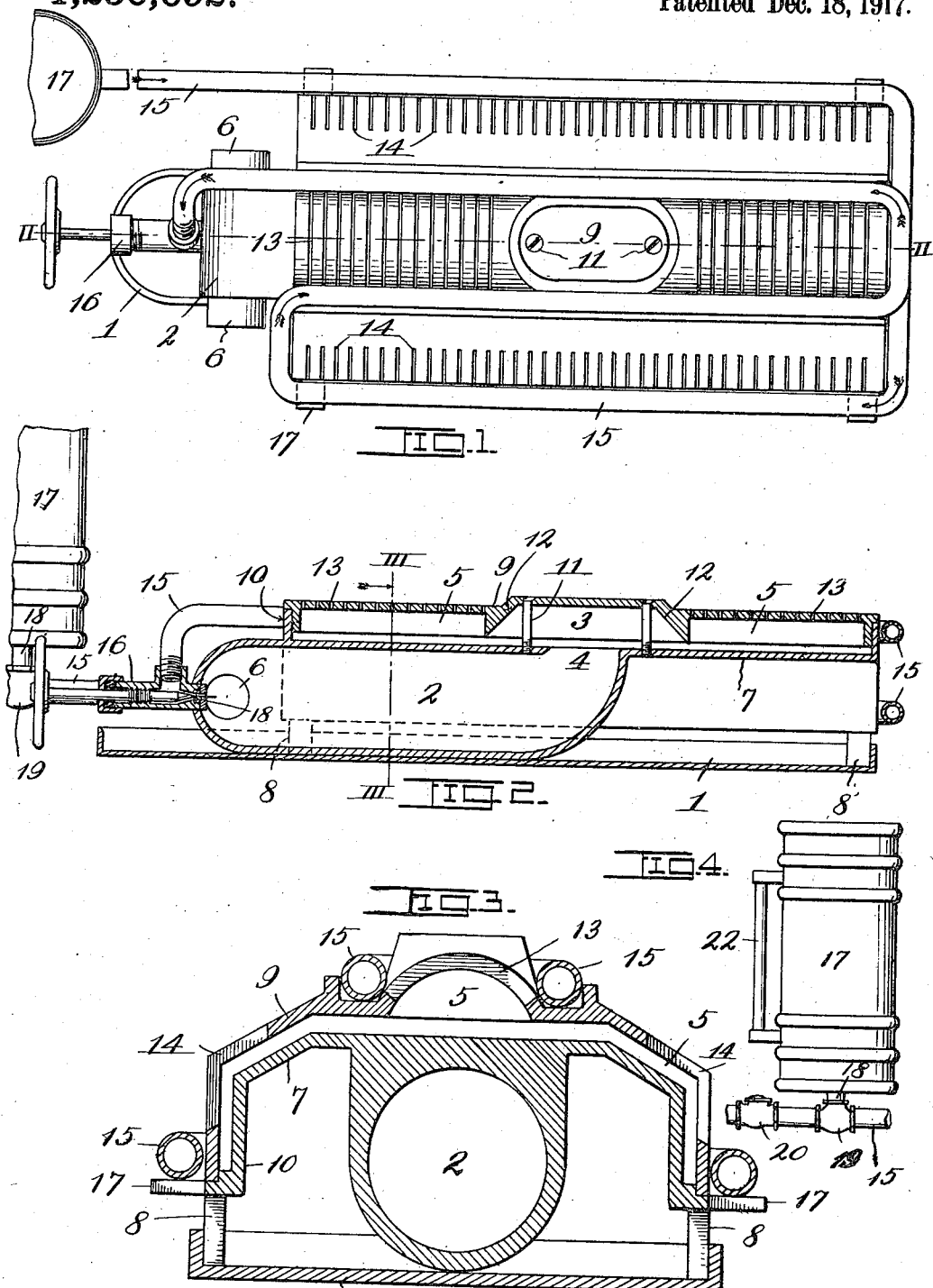

FRANK H. STANARD, OF KANSAS CITY, MISSOURI, ASSIGNOR TO STANARD BLUE FLAME GAS GENERATOR-BURNER CO., A CORPORATION OF MISSOURI.

GAS GENERATOR AND BURNER.

1,250,692.     Specification of Letters Patent.     Patented Dec. 18, 1917.

Application filed December 18, 1916. Serial No. 137,547.

*To all whom it may concern:*

Be it known that I, FRANK H. STANARD, a citizen of the United States, residing at Kansas City, in the county of Jackson and State of Missouri, have invented certain new and useful Improvements in Gas Generators and Burners, of which the following is a specification.

My invention relates to gas generators and burners, and my object is to produce a comparatively simple and inexpensive device of this character whereby hydrocarbon oils, such, for instance, as kerosene can be vaporized and intimately mixed with air to produce an economical and highly combustible gas, which when ignited produces a blue flame of intense heat and free from carbon. The device can be used to advantage in heating and cooking stoves, furnaces, etc., and in order that the invention may be fully understood, reference will now be made to the accompanying drawing, in which:

Figure 1 is a plan view of a gas generator and burner built in accordance with my invention.

Fig. 2 is a central, longitudinal section on line II—II of Fig. 1.

Fig. 3 is a vertical, cross section, enlarged, on line III—III of Fig. 2.

Fig. 4 is an elevation of a stabilizer employed in carrying out the invention.

In carrying out the invention, I employ a pan 1 in which the generator and burner proper rests. Said generator and burner embodies a longitudinal mixing tube 2, a mixing chamber 3 communicating with the discharge end 4 of said mixing tube, and a distributing chamber 5 communicating with and surrounding said mixing chamber.

The end of the mixing tube 2 most remote from its discharge opening 4, has oppositely-disposed air intakes 6 through which a large volume of air is drawn to intermix with the vaporized oil. The bottom wall 7 of the distributing chamber 5 is provided with legs 8 which rest in the pan 1, as disclosed by Figs. 2 and 3.

The top wall 9 of the mixing and distributing chambers 3 and 5, respectively, is preferably, cast in one piece and rests upon the side walls 10 of the distributing chamber, it being reliably held in place by bolts 11. That portion of the top 9 above the mixing chamber 3, is preferably, higher than the portion above the distributing chamber 5 and has downwardly flaring inner walls 12, which insure thorough intermixing of the air and vaporized oil before they escape to the distributing chamber, the top wall 9 of which has a central series of slits 13 and two side series of slits 14 for the passage of the gas just prior to its ignition. The central portion of the top wall 9 is arched to strengthen said wall and provide an avenue for the combustible gas in its passage to the slits 13.

15 designates a vaporizing pipe which receives oil under pressure from a supply tank or other suitable source, not shown, and is coiled about the sides, ends and top of the distributing chamber 5 adjacent to the slits 13 and 14 and communicates with a needle valve 16 fixed in the outer end of the mixing tube 2. The vaporizing pipe 15 is supported by the top wall 9 of the distributing chamber 5 and also by lugs 17, projecting from the longitudinal sides of said chamber.

17 designates a stabilizer communicating with the pipe 15 to insure a substantially constant pressure therein and thus avoid pulsation of the gas at the valve 16. Said stabilizer comprises a tank connected at its lower end by a nipple 18 to a T 19 to which the pipe 15 is connected. Said pipe 15 is provided at a point between the stabilizer 17 and the source of oil supply with a check valve 20, which opens toward the stabilizer and the burner to allow a free flow of oil thereto, but automatically shuts off any back pressure from the burner toward the fuel supply. A sight gage 22 communicating with the stabilizer indicates the height of the oil therein. Aside from its connections with the nipple 18 and the gage 22, the stabilizer is hermetically sealed, so that as the oil enters therein from the pipe 15 the air in the stabilizer becomes compressed and exerts pressure upon the oil, the weight of which, combined with said pressure, overcomes any back pressure from the burner and provides a steady flow of oil to the vaporizer pipe 15.

In practice, a small amount of oil is first placed in the pan 1 and then ignited. The flame thus produced heats the walls of the mixing tube 2 and the walls of the chambers 3 and 5, and also the pipe 15 thereby vaporizing the oil therein. The needle valve 16 is then opened to permit the vapor generated from the oil to discharge from the valve nozzle 18 into the mixing tube 2. As the vapor discharges from the nozzle 18 with considerable force it draws in large volumes of air through the air intakes 6. This air commingles with the vapor in the mixing tube 2 and forms a highly combustible mixture, which on impinging against the top of the mixing chamber 3, is spread out in all directions and forced into the distributing chamber 5 from which it escapes through the slits 13 and 14, where it is ignited. The flame thus produced is of a blue color and gives off intense heat, which on impinging against the vaporizing pipe 15, vaporizes the oil therein before it reaches the needle valve 16, from which it discharges at high velocity.

From the foregoing description, it is apparent that I have produced a gas generator and burner embodying all of the features above enumerated, and one which is economical in the consumption of fuel, owing to the large volume of air utilized, and while I have shown and described the preferred form of my invention, I reserve the right to make such changes in the construction, combination, and arrangement of parts as properly fall within the spirit and scope of the claims.

Having thus described my invention, what I claim and desire to secure by Letters Patent, is:

1. In a device of the character described, a longitudinal mixing tube having oppositely-disposed air-intakes at one end and a discharge opening at its opposite end, means for discharging vaporized oil into said mixing tube, a mixing chamber communicating with and located above the discharge opening in the mixing tube, a gas distributing chamber communicating with said mixing chamber and provided with openings for the escape of the gas, and a vaporizing coil adjacent the openings in the distributing chamber and arranged to discharge into the said means for discharging the vaporized oil into the mixing tube.

2. A device of the character described, comprising a longitudinal mixing tube having oppositely-disposed air-intakes at one end and a discharge opening at its opposite end, a needle valve for discharging a vapor into said mixing tube adjacent its air-intakes, a mixing chamber arranged centrally over the discharge opening of the mixing tube provided with downwardly flaring walls, a distributing chamber communicating with and surrounding said mixing chamber and provided with slits for the escape of the combustible mixture, and a vaporizing pipe coiled about said distributing chamber adjacent the slits therein and communicating with the needle valve, substantially as shown and described.

In testimony whereof I affix my signature, in the presence of two witnesses.

FRANK H. STANARD.

Witnesses:
F. G. FISCHER,
L. J. FISCHER.

Copies of this patent may be obtained for five cents each, by addressing the "Commissioner of Patents, Washington, D. C."